(12) United States Patent
Imaizumi

(10) Patent No.: US 7,230,693 B2
(45) Date of Patent: Jun. 12, 2007

(54) LENS METER

(75) Inventor: Satoshi Imaizumi, Hoi-gun (JP)

(73) Assignee: Nidek Co., Ltd., Gamagori-shi (JP)

( * ) Notice: Subject to any disclaimer, the term of this patent is extended or adjusted under 35 U.S.C. 154(b) by 76 days.

(21) Appl. No.: 11/090,202

(22) Filed: Mar. 28, 2005

(65) Prior Publication Data

US 2005/0219514 A1    Oct. 6, 2005

(30) Foreign Application Priority Data

Mar. 31, 2004   (JP)   ............... 2004-106804

(51) Int. Cl.
*G01B 9/00*   (2006.01)
(52) U.S. Cl. .................................. 356/124; 356/125
(58) Field of Classification Search ......... 356/124–127
See application file for complete search history.

(56) References Cited

U.S. PATENT DOCUMENTS

| 5,173,739 | A | | 12/1992 | Kurachi et al. |
| 5,231,460 | A | * | 7/1993 | Kohayakawa ............. 356/125 |
| 5,432,596 | A | * | 7/1995 | Hayashi ................... 356/124 |
| 6,221,540 | B1 | * | 4/2001 | Onoda et al. .............. 430/5 |

FOREIGN PATENT DOCUMENTS

| JP | A 4-66834 | 3/1992 |
| JP | A 9-33396 | 2/1997 |
| JP | A 11-125581 | 5/1999 |

OTHER PUBLICATIONS

Hori et al., "Application of Diffraction Optical Element to Measurement," Optical Alliance, Japan Industrial Publishing Co., Ltd., Tokyo pp. 36-39, 1998.

* cited by examiner

*Primary Examiner*—Layla Lauchman
*Assistant Examiner*—Tri Ton
(74) *Attorney, Agent, or Firm*—Oliff & Berridge, PLC

(57) ABSTRACT

A lens meter for measuring optical characteristics of a subject lens to be measured includes at least three light sources for measurement, a projecting lens which projects measurement light bundles from the light sources onto the subject lens placed on a projecting-lens optical axis, a diaphragm having an aperture disposed at an anterior focal point of the projecting lens between the light sources and the projecting lens, and a two-dimensional photodetector photo-receiving the light bundles passing through the subject lens after passing through the aperture of the diaphragm and the projecting lens without the use of an image forming optical system, and the projecting lens is disposed so that the light sources is conjugate with the photodetector in a case where the subject lens with a specific diopter in the vicinity of 0D or a frequently-used specific diopter is placed on the optical axis.

3 Claims, 3 Drawing Sheets

LENS METER

BACKGROUND OF THE INVENTION

1. Field of the Invention

The present invention relates to a lens meter for measuring optical characteristics of a subject lens to be measured.

2. Description of Related Art

Conventionally, there is proposed a lens meter for measuring optical characteristics of a subject lens to be measured, which collimates a measurement light bundle emitted from a light source for measurement by a collimator lens to project the measurement light bundle onto the subject lens, photo-receives the measurement light bundle passing through the subject lens on a two-dimensional photodetector via at least three pinholes (openings) and convergent lenses arranged respectively therein, and detects positions of pinhole images (refer to Japanese Patent Application Unexamined Publication No. Hei 11-125581).

Further, proposed is a lens meter in which a diffraction lens array is arranged as convergent lenses for pinholes in order to prevent an inaccurate measurement result brought by local disturbance in a wavefront of the measurement light bundle or deformation of pinhole images resulting from a scratch or soil on a subject lens to be measured (HORI, Nobuo et al., "Application of a Diffraction Optical Element to Measurements", OPTICAL ALLIANCE, Japan Industrial Publishing Co., Ltd., Tokyo, (Nov., 1998), PP.36-39).

However, the diffraction lens array arranged for the pinholes is hard to work and high in cost. Further, when there is a big scratch or soil on the subject lens, there may be cases where an inaccurate measurement result cannot be prevented.

SUMMARY OF THE INVENTION

An object of the invention is to overcome the problems described above and to provide a lens meter having a simple configuration, which is capable of measuring optical characteristics of a subject lens to be measured with high precision.

To achieve the objects and in accordance with the purpose of the present invention, a lens meter for measuring optical characteristics of a subject lens to be measured includes at least three light sources for measurement, a projecting lens which projects measurement light bundles from the light sources onto the subject lens placed on an optical axis of the projecting lens, a diaphragm having an aperture disposed at an anterior focal point of the projecting lens between the light sources and the projecting lens, and a two-dimensional photodetector which photo-receives the measurement light bundles passing through the subject lens after passing through the aperture of the diaphragm and the projecting lens without the use of an image forming optical system, and wherein the projecting lens is disposed so that the light sources have a conjugate relation with the photodetector in a case where the subject lens with a specific diopter in the vicinity of 0D or a frequently-used specific diopter is placed on the optical axis of the projecting lens.

Additional objects and advantages of the invention are set forth in the description which follows, are obvious from the description, or may be learned by practicing the invention. The objects and advantages of the invention may be realized and attained by the lens meter in the claims.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
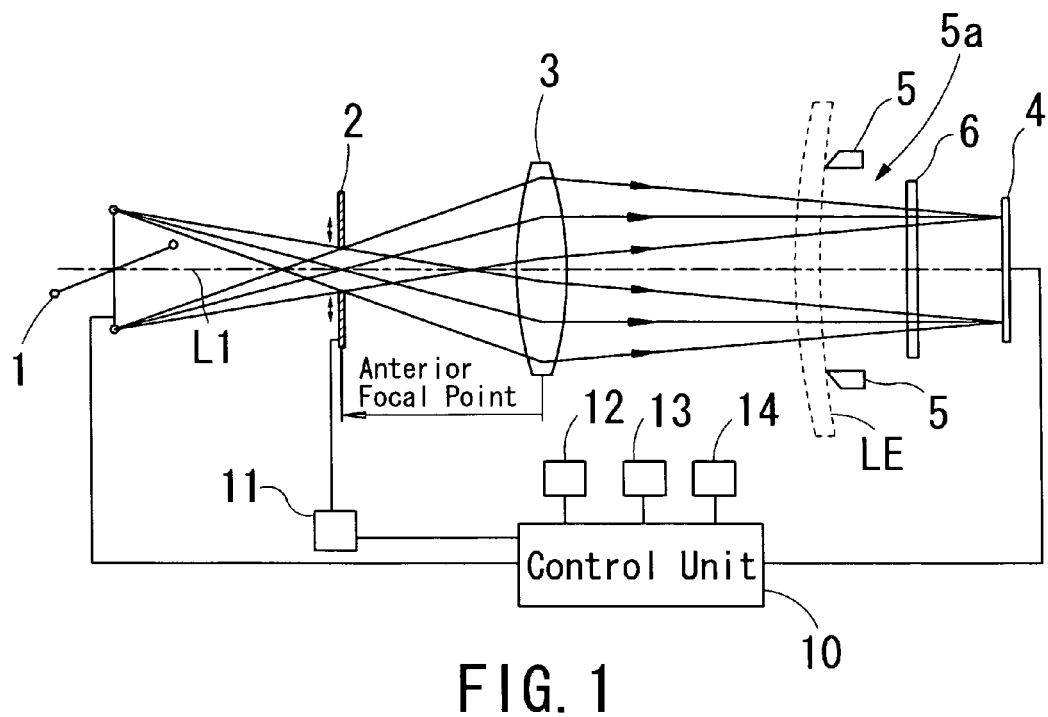
FIG. 1 is a view showing a schematic configuration of an optical system and a control system of a lens meter consistent with the preferred embodiment of the present invention.

A detailed description of one preferred embodiment of a lens meter embodied by the present invention is provided below with reference to the accompanying drawings FIG. 1 is a view showing a schematic configuration of an optical system and a control system of a lens meter consistent with the preferred embodiment of the present invention.

Four light sources 1 for measurement such as white LEDs are disposed in equidistant positions at intervals of 90° around a measurement optical axis L1 positioned in their center, which is an optical axis of a projecting lens 3 to be described later. A diaphragm 2 is provided with a diameter-variable aperture (opening) having the optical axis L1 as its center, limits measurement light bundles from the light sources 1. A nosepiece (lens rest) 5 is provided with an aperture (opening) 5a having the optical axis L1 as its center, and supports a subject lens LE to be measured on the aperture 5a. The projecting lens 3 projects the measurement light bundles passing through the aperture of the diaphragm 2 onto the lens LE supported on the nosepiece 5. A bandpass filter 6 passes only the measurement light bundles passing through the lens LE and the aperture 5a in the vicinity of e-line (546.07 nm). A two-dimensional photodetector 4 photo-receives the measurement light bundles passing through the filter 6.

The aperture of the diaphragm 2 is disposed at an anterior focal point of the lens 3 between the light sources 1 and the lens 3, and the aperture of the diaphragm 2 and the lens 3 constitute a posterior telecentric optical system. Further, the lens 3 is disposed so that the light sources 1 have a conjugate relation with the photodetector 4 (it is preferable only if an approximately conjugate relation is established in consideration of required accuracy in measurement) in case where a lens LE with a specific diopter in the vicinity of 0D or a frequently-used specific diopter(in the vicinity of −1to −2 D is placed The four light bundles from the four light sources 1 are made into four convergent light bundles via the aperture of the diaphragm 2 and the lens 3 to be projected onto the lens LE. Then, the four measurement light bundles passing through the lens LE are photo-received on the photodetector 4 without passing through an image forming optical system such as a lens (formed on the photodetector 4 are four spot images by the four light sources 1). An output signal from the photodetector 4 is input into a control unit 10 which obtains optical characteristics of the lens LE through a predetermined calculation.

The control unit 10 is connected with a diaphragm driving unit 11 for changing the aperture diameter of the diaphragm 2, a memory 12, a monitor 13 which displays a measurement result and the like, a switch unit 14, and the like.

A measurement method for measuring the lens LE by the use of a measurement optical system as above will be described. The light sources 1 are turned on to illuminate the diaphragm 2. Then, the measurement light bundles from the light sources 1 pass through the aperture of the diaphragm 2 and the lens 3, making principal rays of the light bundles parallel to the optical axis L1, to be projected onto the lens LE. In the meantime, the measurement light bundles are converged by the lens 3 to be projected onto the lens LE. The measurement light bundles passing through the lens LE are photo-received on the photodetector 4 via the filter 6.

Figures 2A, 2B:
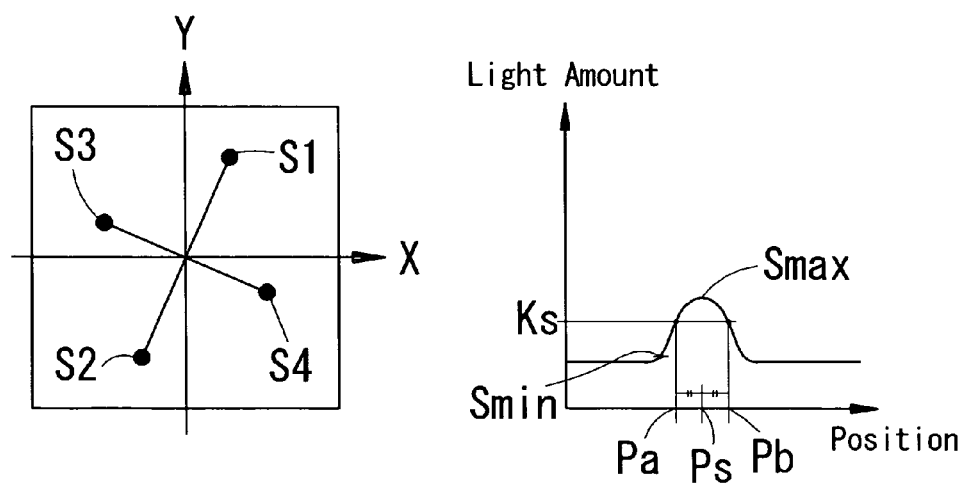
FIG. 2A is a view showing spot images formed on a two-dimensional photodetector at the time of measuring a subject lens to be measured.
FIG. 2B is a view showing a change in a photo-receiving amount of a spot image.

FIG. 2A is a view showing four spot images S1 to S4 formed on the photodetector 4 at the time of measuring the lens LE. When the lens LE is not placed on the optical axis L1, the spot images by the measurement light bundles made parallel to the optical axis 1 are formed on the photodetector 4. In this connection, when the lens LE with a positive diopter is placed on the optical axis L1, spaces between the spot images become smaller than those in the case of not placing the lens LE, and when the lens LE with a negative diopter is placed on the optical axis L1, the spaces between the spot images become wider, contrarily to the above, than those in the case of not placing the lens LE. Further, when the lens LE with a cylindrical diopter is placed on the optical axis L1, lines connecting the opposed spot images are inclined more than those in the case of not placing the lens LE, depending on a cylindrical axial angle of the lens LE (see FIG. 2A).

The control unit 10 controls to detect positions of the spot images S1 to S4 on the photodetector 4. FIG. 2B is a view showing a change in a photo-receiving amount of the spot image. First, the control unit 10 controls to find Smin: a rising edge of the change in the photo-receiving amount, and then find Pa: a displacement (position) on the photodetector 4 when the photo-receiving amount reaches Ks: a light amount increased from the rising edge Smin by a predetermined level. Further, the control unit 10 controls to find Pb; a displacement (position) on the photodetector 4 when the photo-receiving amount reaches the light amount Ks again after passing Smax: a peak of the photo-receiving amount. Then, a midpoint between the displacements Pa and Pb is set as Ps: a position of the spot image on the photodetector 4. The spot images on the photodetector 4 are formed by the light bundles converged by the lens 3, so that inconsistency in light intensity hardly occurs and the photo-receiving amount of the spot images becomes large. Therefore, an S/N ratio is improved to stabilize accuracy in detection of the spot image positions.

In the present embodiment, owing to the above-described disposition and configuration of the lens 3, when measuring the lens LE with the specific diopter in the vicinity of 0D or the frequently-used specific diopter (in the vicinity of −1 D to −2 D), the spot images on the photodetector 4 are made smallest, improving the accuracy in detection of the spot image positions. That is, reliability of a measurement result of the lens LE with the specific diopter in the vicinity of 0D or the frequently-used specific diopter is especially enhanced.

To suppress a measurement error in a case where there is a scratch or soil on the lens LE, it is preferable to widen diameters of the measurement light bundles passing through the lens LE. The light bundle diameters are confined by the aperture diameter of the diaphragm 2. Therefore, the aperture diameter of the diaphragm 2 is preferably made in such size that the four spot images S1 to S4 are formed separately on the photodetector 4 when measuring the lens LE with a measurable high-positive diopter.

The control unit 10 controls to detect the positions of the spot images S1 to S4 on the photodetector 4, and, based on a positional relationship thereof, find the optical characteristics such as a spherical diopter, a cylindrical diopter and a cylindrical axial angle. Therefore, with a simple configuration as above, the measurement error caused by a scratch or soil on the lens LE may be suppressed and prevented even without a configuration such as using an expensive diffraction lens in the measurement optical system. Further, since the measurement light bundles enter the lens LE at the same positions even in the case of measuring the lens LE with a different diopter, it is possible to constantly measure the lens LE at the same positions regardless of diopter. Consequently, a displacement amount per diopter of the spot images on the photodetector 4 is constant regardless of diopter, and thereby variations in measurement accuracy are suppressed and stable measurement may be performed.

Incidentally, in the optical system of the present embodiment, the number of the light sources 1 is four, however, at least three light sources may be provided around the optical axis 1 as their center.

Figure 3A:
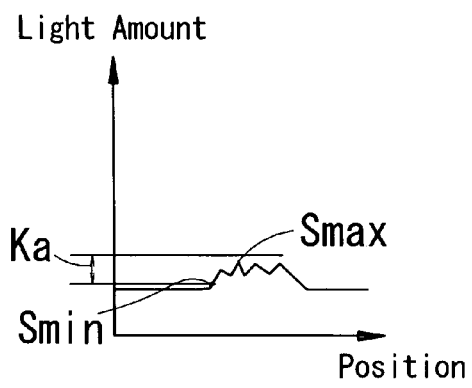
FIG. 3A is a view showing a change in a photo-receiving amount of a spot image in a case where there is a scratch or soil on a subject lens to be measured, on which a measurement light bundle falls.
Figure 3B:
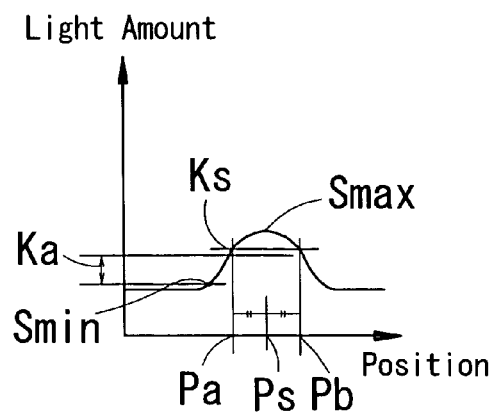
FIG. 3B is a view showing a change in the photo-receiving amount of the spot image in a case where an aperture diameter of a diaphragm is widened in measuring the subject lens in FIG. 3A.

Next, operations in which the aperture diameter of the diaphragm 2 is changed will be described. FIG. 3A is a view showing a change in the photo-receiving amount of the spot image in a case where there is a big scratch or soil on the lens LE, on which the measurement light bundle falls. When the measurement light bundle passes through a part with the scratch or soil on the lens LE, the spot image on the photodetector 4 is deformed to decrease the photo-receiving amount, so that the accuracy in detection of the spot image position is lowered, leading to low measurement accuracy. Here, the control unit 10 controls to calculate a difference between Smin, the rising edge in the photo-receiving amount of the spot images, and Smax, the peak in the photo-receiving amount of the spot images, and drive the driving unit 11 to widen the aperture diameter of the diaphragm 2 when the photo-receiving amount difference falls short of Ka: a predetermined permissible range. The widening of the aperture diameter of the diaphragm 2 allows the diameters of the light bundles passing through the lens LE to be widened, enlarging the spot images on the photodetector 4. FIG. 3B is a view showing a change in the photo-receiving amount of the spot image in a case where the aperture diameter of the diaphragm 2 is widened.

When the photo-receiving amount difference exceeds the permissible range Ka and the sufficient photo-receiving amount may be secured, the accuracy in detection of the spot image positions is improved. As in a case where the photo-receiving amount is decreased by a scratch or soil on the lens LE, the above-described configuration has the same effect in a case where the photo-receiving amount is decreased by enlarged and blurred spot images in measuring the lens LE with a high diopter. Also in this case, the photo-receiving amount of the spot images on the photodetector 4 is detected, and the aperture diameter of the diaphragm 2 is widened when the photo-receiving amount difference falls short of the permissible range Ka, as described above.

Figure 4:
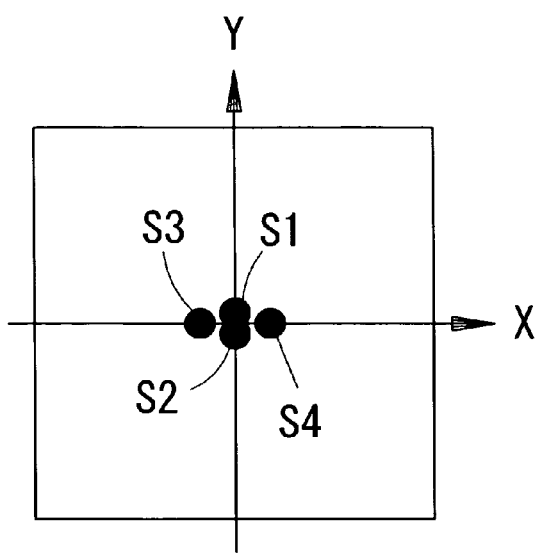
FIG. 4 is a view showing spot images on the photodetector at the time of measuring a subject lens to be measured with a high positive diopter.
Figure 5A:
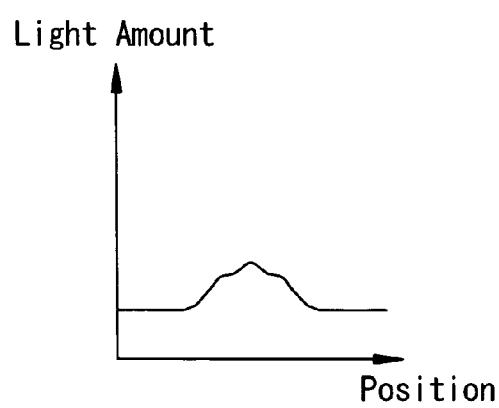
FIG. 5A is a view showing a change in a photo-receiving amount of the overlapping spot images in FIG. 4.
Figure 5B:
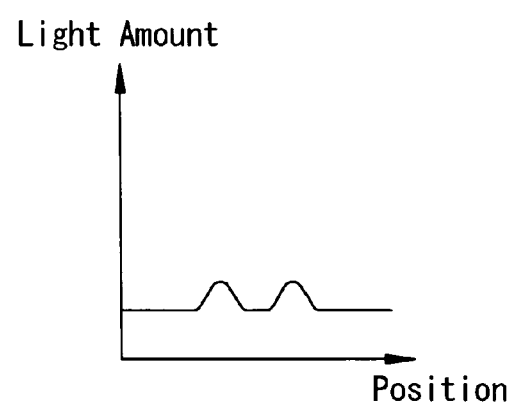
FIG. 5B is a view showing a change in the photo-receiving amount of both the spot images when separated, which are overlapping in FIG. 4.

FIG. 4 is a view showing spot images S1 to S4 on the photodetector 4 at the time of measuring the lens LE with a high positive diopter. In the case of measuring the lens LE, the spot images S1 to S4 sometimes get closer each other to partly overlap as shown in FIG. 4. In such a case, the change in the photo-receiving amount of the overlapping spot images S1 and S2 becomes like the one shown in FIG. 5A, so that the control unit 10 cannot accurately detect respective positions of the spot images S1 and S2. Here, the control unit 10 controls to make the aperture diameter of the diaphragm 2 smaller in a case where all of the four light sources 1 are turned on, and all the spot images S1 to S4 are not detected (i.e., the detected spot images are three or less). Making the aperture diameter of the diaphragm 2 smaller allows the diameters of the light bundles passing through the lens LE to be smaller, making the spot images smaller. Accordingly, the spot images S1 to S4 may be formed separately as shown in FIG. 5B, and the respective positions of the spot images S1 to S4 may be detected accurately. When the overlapping spot images S1 and S2 are separated in this manner, the control unit 10 controls to detect the positions of the spot images S1 to S4 and find the optical characteristics of the lens LE based on a positional relationship of the spot images S1 to S4. With the configuration as above, even the lens LE with a high positive diopter may be measured without lowering the measurement accuracy. Besides, in a case where the spot images S1 to S4 are not detected even though the aperture diameter of the diaphragm 2 is made smaller, the control unit 10 may judge that it is due to a scratch or soil.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring optical characteristics of a subject lens to be measured, the lens meter comprising:
   a measurement optical system including:
      at least three spot light sources for measurement disposed equidistant from a measurement optical axis of the measurement optical system;
      a projecting lens;
      a diaphragm having an aperture disposed at an anterior focal point of the projecting lens between the light sources and the projecting lens, a diameter of the aperture of the diaphragm being variable; and
      a two-dimensional photodetector which photo-receives measurement light bundles from the light sources passing through the subject lens after passing through the aperture of the diaphragm and the projecting lens to detect images of the light sources,
   wherein the projecting lens is disposed so that the light sources have a conjugate relation with the photodetector in a case where the subject lens with one of a specific diopter in the vicinity of 0 D and a frequently-used specific diopter is placed at a measurement position on the measurement optical axis; and
   control means for obtaining one of a difference of a light amount in the image of the light source and the number of the detected light source images based on an output from the photodetector, and changing the diameter of the aperture of the diaphragm based on a result of the obtainment.

2. A lens meter for measuring optical characteristics of a subject lens to be measured, the lens meter comprising:
   at least three light sources for measurement;
   a projecting lens which projects measurement light bundles from the light sources onto the subject lens placed on an optical axis of the projecting lens;
   a diaphragm having an aperture disposed at an anterior focal point of the projecting lens between the light sources and the projecting lens; and
   a two-dimensional photodetector which photo-receives the measurement light bundles passing through the subject lens after passing through the aperture of the diaphragm and the projecting lens without the use of an image forming optical system, and
   wherein the projecting lens is disposed so that the light sources have a conjugate relation with the photodetector in a case where the subject lens with one of a specific diopter in the vicinity of 0 D and a frequently-used specific diopter is placed on the optical axis of the projecting lens, and
   the aperture of the diaphragm has its diameter changed based on an output from the photodetector in one of cases where a photo-receiving amount of at least one of spot images formed on the photodetector by the light sources falls short of a predetermined level, and where the number of the spot images falls short of a predetermined number.

3. A lens meter for measuring optical characteristics of a subject lens to be measured, the lens meter comprising:
   a measurement optical system including:
      at least three spot light sources for measurement disposed equidistant from a measurement optical axis of the measurement optical system;
      a projecting lens;
      a diaphragm having an aperture disposed at an anterior focal point of the projecting lens between the light sources and the projecting lens, a diameter of the aperture of the diaphragm being variable; and
      a two-dimensional photodetector disposed so as to have a conjugate relation with the light sources with respect to the projecting lens in a case where the subject lens with one of a specific diopter in the vicinity of 0 D and a frequently-used specific diopter is placed at a measurement position on the measurement optical axis,
   wherein the measurement optical system makes measurement light bundles from the light sources passing through the aperture of the diaphragm to be formed as images of the light sources on the photodetector via the subject lens by the projecting lens; and
   control means for obtaining one of a difference of a light amount in the image of the light source and the number of the detected light source images based on an output from the photodetector, and changing the diameter of the aperture of the diaphragm based on a result of the obtainment.

* * * * *